March 7, 1961 D. BUCCICONE 2,973,960
ARTICLE CONVEYOR
Filed Jan. 14, 1960 4 Sheets-Sheet 1
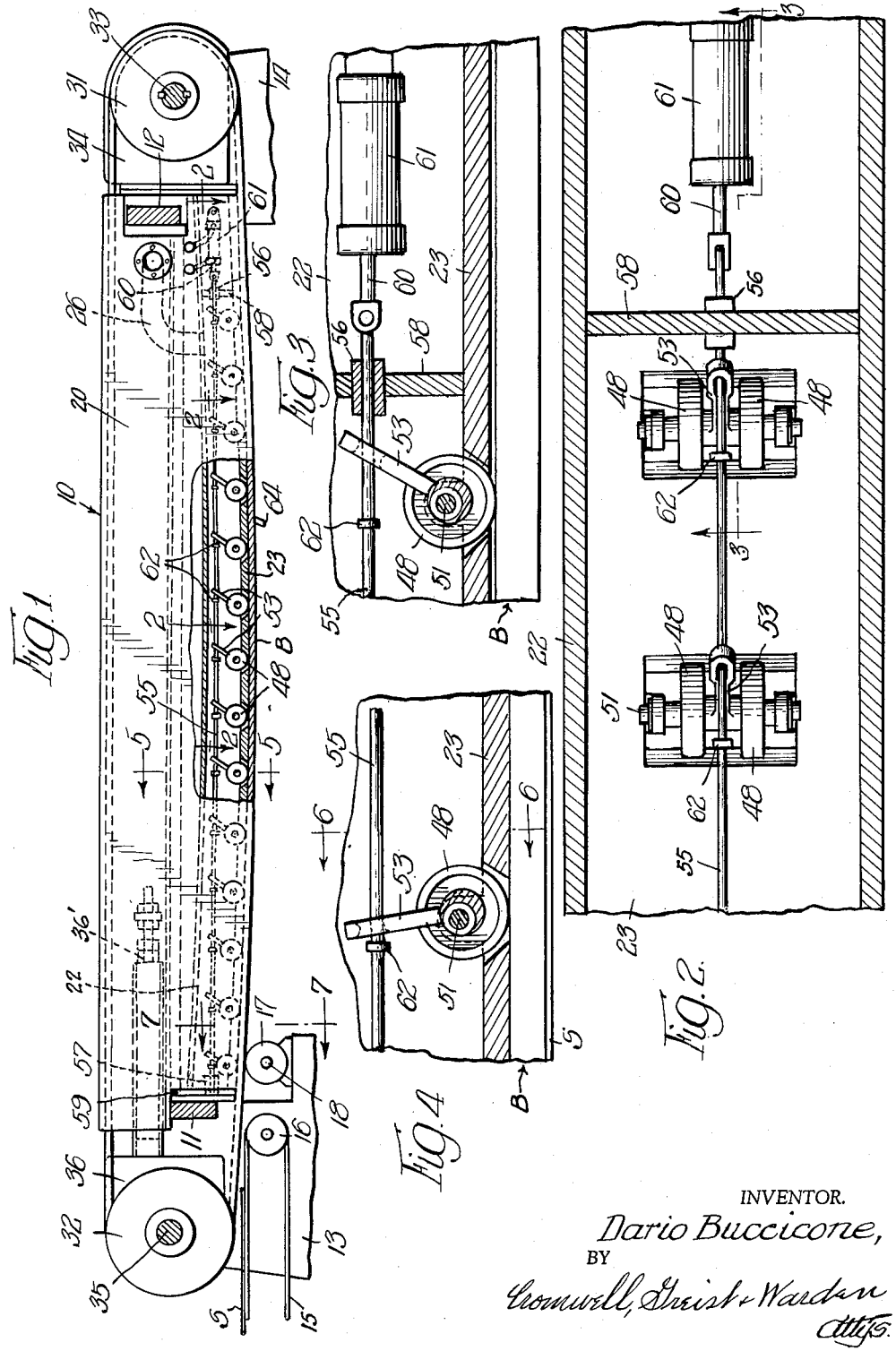
INVENTOR.
Dario Buccicone,
BY
Cromwell, Greist & Warden
Attys.

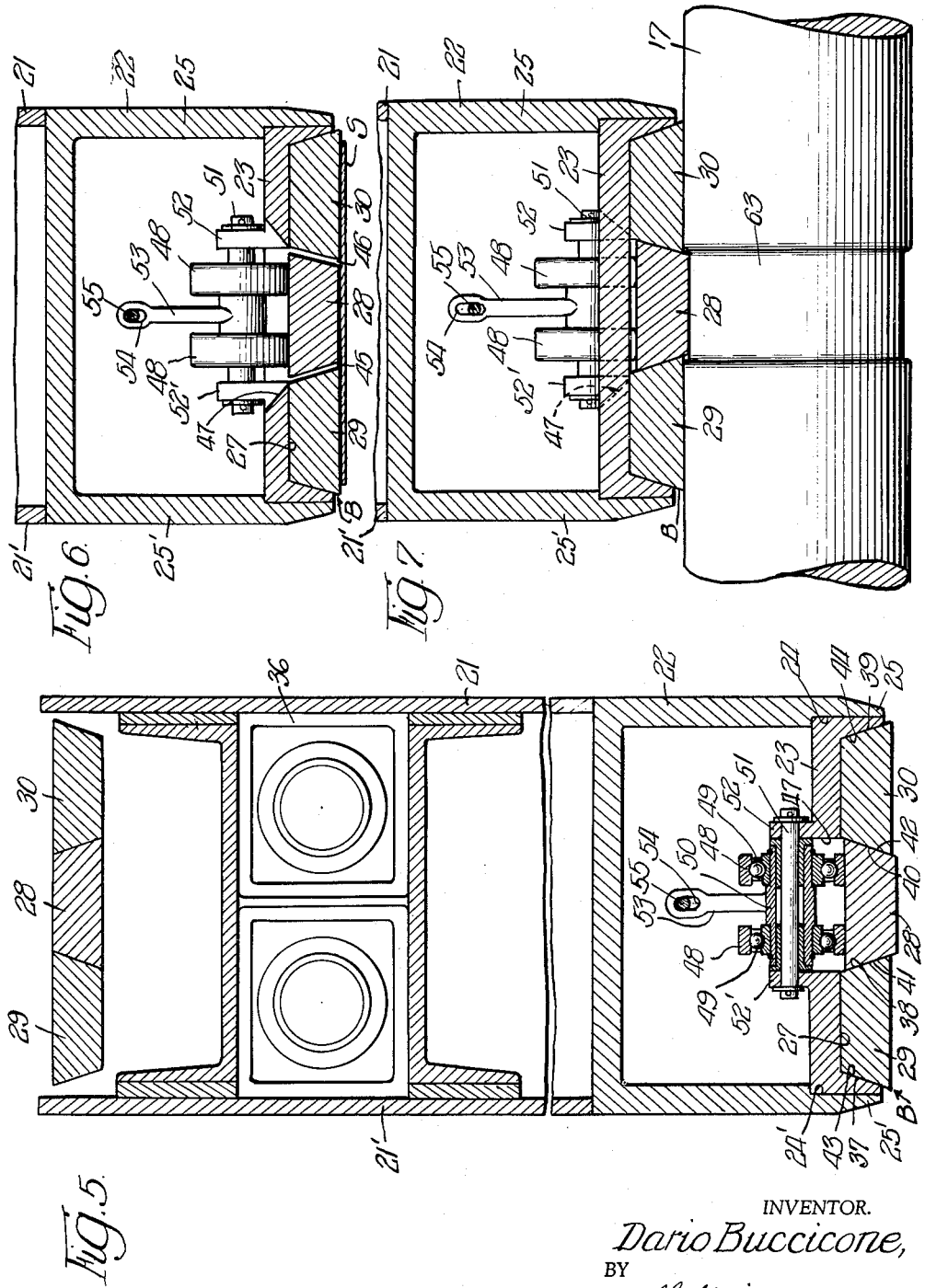

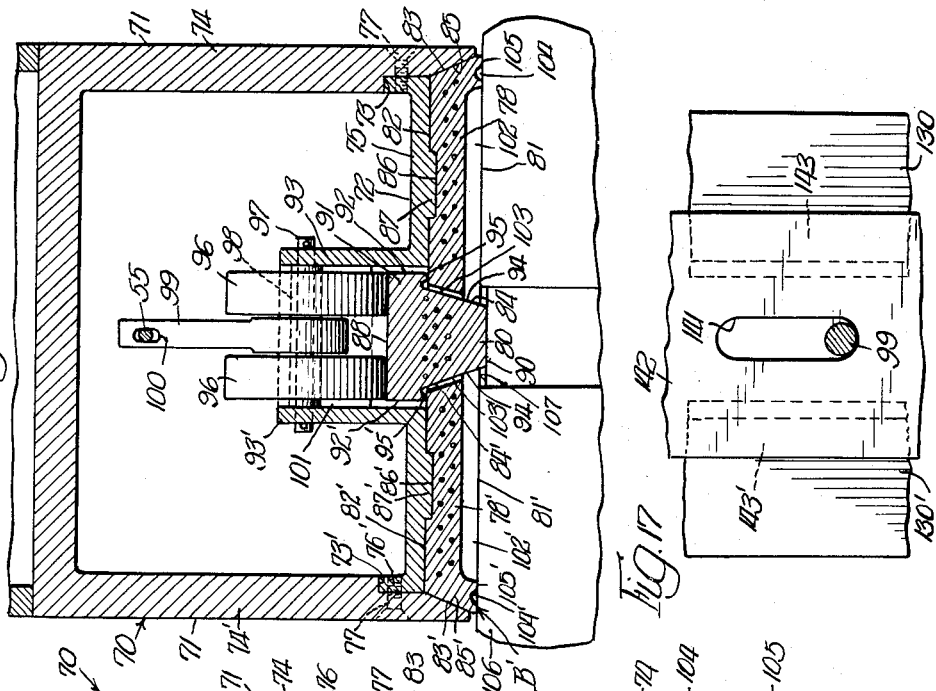

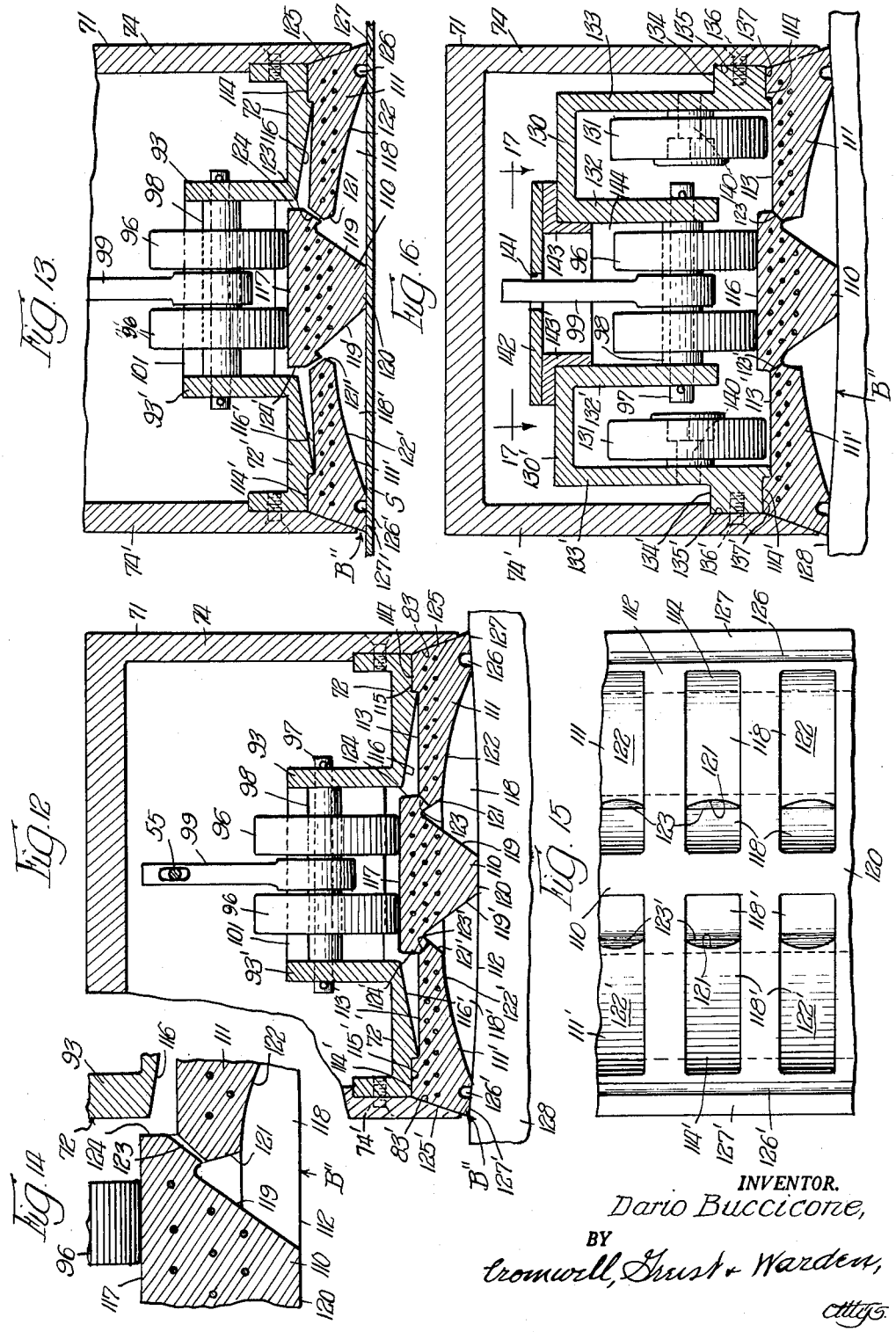

United States Patent Office 2,973,960
Patented Mar. 7, 1961

2,973,960

ARTICLE CONVEYOR

Dario Buccicone, Gary, Ind., assignor to Bucciconi Engineering Co., Inc., Gary, Ind., a corporation of Indiana Filed Jan. 14, 1960, Ser. No. 2,520

30 Claims. (Cl. 271—74)

This invention relates to article conveyors and is more particularly concerned with improvements in an overhead conveyor which employs suction for holding sheets or similar articles against the bottom surface of one or more traveling belts.

This application is a continuation-in-part of application Serial No. 747,787, now abandoned.

It is a general object of the present invention to provide an overhead traveling belt conveyor for handling sheets or similar articles in which the articles are held in engagement with the bottom surface of the conveyor by suction applied through openings in the belt.

It is a more specific object of the invention to provide an overhead conveyor having an endless traveling belt formation on the bottom run of which the articles to be conveyed are held by suction applied through apertures which are automatically opened as the articles are engaged with the bottom surface of the belt formation and advanced along the conveyor.

It is a still more specific object of the invention to provide an overhead conveyor having a series of traveling belt sections which are arranged in side-by-side relation for engagement of the bottom surfaces thereof by a sheet or other article which is to be conveyed and the article is held in engagement therewith by suction applied through openings which are automatically formed between the belt sections as the article being carried is advanced along the conveyor.

It is another object of the invention to provide a conveyor wherein an endless traveling belt is supported on spaced end pulleys with its bottom run traveling beneath an apertured vacuum chamber and wherein the belt is constructed so that apertures are formed in the bottom run thereof upon an article being engaged with the bottom surface which apertures permit the vacuum to be effective for holding the article in contact with the belt surface whereby the article is advanced by the belt.

It is a further object of the invention to provide an article conveyor having an endless traveling belt supported on spaced end pulleys with its lower run traveling beneath an apertured vacuum chamber wherein the belt is provided with slit-like openings which are normally closed and which are automatically opened upon an article being forced into engagement with the bottom surface of the belt so as to form connecting passageways with the apertures in the vacuum chamber through which suction is applied to the article to hold the article on the conveyor for advancing movement with the belt.

It is another object of the invention to provide an overhead conveyor which comprises a supporting frame, an article carrying belt having a plurality of parallel belt sections mounted on spaced end pulleys on the supporting frame and a vacuum chamber having openings over which the belt travels with mechanism which is automatically operated by advance of the article being carried to move one or more of the belt sections relative to the adjoining belt sections so as to provide a passageway through the belt which connects with the openings in the vacuum chamber whereby suction is applied to the surface of the article sufficient to hold the article in engagement with the belt surface.

It is another object of the invention to provide an overhead conveyor having a plurality of traveling belt members which are in edge confronting relation and which are adapted to receive on their bottom surface a sheet or other article to be carried, the belt members being arranged to travel along an apertured vacuum chamber and having associated mechanism for separating portions of the belt members sufficiently to form air passageways which permit the vacuum to be effective for holding the article in contact with the bottom surface of the belt members so that it is advanced by the same.

It is a further object of the invention to provide an overhead conveyor which comprises a supporting frame, a plurality of article carrying belt members supported on end pulleys thereon and a vacuum chamber with openings over which one of the belt members travels together with mechanism which is automatically operated by advance of the article being carried to move one or more of the belt members relative to the adjoining belt members so as to provide a passageway between the belt members for applying suction to the surface of the article sufficient to retain the same in engagement with the lowermost surface of the belt members.

It is a still further object of the invention to provide an overhead conveyor for sheets or similar articles which comprises a plurality of belt members supported on end pulleys and arranged with their bottom runs traveling in edge abutting relation beneath an apertured vacuum chamber, the apertures being closed by the belt members when no article is being carried, mechanism for automatically displacing one or more of the belt members when an article is fed thereto, thereby opening a passageway between the belt members and applying suction through the apertures and the passageway to the article to hold it in engagement with the bottom surfaces of the traveling belt members, and control means for restoring the displaced belt member or belt members when the article has advanced to a predetermined point to close the passageway and release the article for deposit beneath the conveyor.

These and other objects and advantages of the invention will be apparent from a consideration of the conveyor apparatus which is shown by way of illustration in the accompanying drawings wherein:

Figure 1 is a side elevation of a sheet piling apparatus having an overhead conveyor which embodies therein the principal features of the invention, with portions of the apparatus being broken away or omitted;

Fig. 2 is a fragmentary horizontal section taken on the line 2—2 of Figure 1, to an enlarged scale;

Figure 3 is a fragmentary section taken on the line 3—3 of Figure 2;

Figure 4 is a fragmentary section similar to the section shown in Figure 3, but with the belts in open position;

Figure 5 is a cross section taken on the line 5—5 of Figure 1, to an enlarged scale, and with portions broken away;

Figure 6 is a fragmentary cross section, taken on the line 6—6 of Figure 4, to an enlarged scale;

Figure 7 is a fragmentary cross section taken on the line 7—7 of Figure 1, to an enlarged scale;

Figure 8 is a cross section similar to Figure 7 illustrating a modified form of the conveyor;

Figure 9 is a cross section similar to Figure 6 with the form of the conveyor shown in Figure 8;

Figure 10 is a fragmentary cross section taken on the same plane as Figure 9 to a larger scale;

Figure 11 is a plan view of the bottom face of the conveyor shown in Figure 8;

Figure 12 is a cross section similar to Figure 7 illustrating another form of the conveyor;

Figure 13 is a cross section similar to Figure 6 with the form of the conveyor shown in Figure 12;

Figure 14 is a fragmentary cross section taken on the same plane as Figure 13, to a larger scale;

Figure 15 is a plan view of the bottom face of the conveyor shown in Figure 11;

Figure 16 is a cross section similar to Figure 7 illustrating a further modification of the conveyor; and Figure 17 is a cross section taken on the line 17—17 of Figure 16.

Referring first to Figures 1 and 2, there is illustrated a portion of a sheet handling apparatus which includes a rail type overhead conveyor having embodied therein the principal features of the invention. The apparatus illustrated is particularly adapted for handling sheets of relatively light material, such as aluminum. However, it may be employed to handle any other similar article such as rigid plastic, copper, brass, stainless steel, cold rolled steel sheets, etc.

The conveyor rail unit or assembly 10 is supported at its opposite ends on cross beams 11 and 12 which are in turn supported on end stands 13 and 14. While one conveyor unit 10 is shown, it will be apparent that several could be supported side-by-side on the same cross beams 11 and 12, the number depending upon the width of the sheets or other articles to be handled. A feeding conveyor 15 for delivering sheets S or other articles to the underside of the conveyor unit 10 has its delivery end supported on the pulley 16 which is in turn supported on suitable bearing brackets (not shown) on the stand 13. A sheet feeding roll 17 is supported on a shaft 18 which is in turn mounted on the stand 13 beneath the receiving end of the conveyor unit 10 so that the roll 17 is normally in engagement with the bottom surface of the conveyor unit 10 and guides the leading end of a sheet S into engagement with the same. The apparatus when employed as a sheet piler will include an end stop mechanism and a back stop, neither of which is shown since they form no part of the present invention.

The conveyor unit or assembly 10, as illustrated in Figures 1 to 7, comprises a main frame 20 consisting of vertically disposed laterally spaced side plates 21 and 21' (Figures 1 and 5) which are connected at their bottom edges by a downwardly facing channel member 22, welded or otherwise secured thereto. A belt guiding plate 23 is secured at its side edges in recesses or grooves 24, 24' provided in the inside lower edges of the side flanges 25, 25' of the channel member 22. The belt guiding plate 23 cooperates with the channel member 22 which has suitable end closures to form a suction or vacuum chamber which is connected by a suitable conduit 26 at one end thereof to a vacuum line or pump (not shown). The belt guiding plate 23 has its bottom face recessed at 27 to receive an endless traveling belt formation or assembly B which comprises three relatively narrow parallel belt sections or members 28, 29 and 30.

The belt members 28, 29 and 30 are mounted on end supporting pulley formations 31 and 32 at opposite ends of the conveyor frame 20. The pulley formation 31 is mounted on a cross shaft 33 in a fixed housing 34 at the one end of the frame 20 and the shaft 33 is connected to a suitable power drive (not shown). The pulley formation 32 is mounted on a cross shaft 35 in a horizontally movable housing 36 at the other end of the frame 20. The housing 36 is supported on the frame 20 for horizontal sliding adjustment and the mounting includes a tension applying device indicated at 36' so as to control the tension in the belt members 28, 29 and 30. The belt members 28, 29 and 30 may be mounted on separate pulleys at the tension applying end of the frame and provision made for adjusting the tension in each belt member individually. The three belt members 28, 29 and 30 travel at the same speed and form in effect a single belt assembly B with three parallel sections in side-by-side or adjoining relation.

The traveling belt members 28, 29 and 30 have a truncated triangular cross section so as to provide each belt member with opposite side edges which are tapered inwardly in converging relation toward one face or flat side thereof. The two outside belt members 29 and 30 are arranged with the lower runs thereof extending in laterally spaced relation along opposite sides of the belt guide plate 23 and with the tapered edges 37, 38 and 39, 40 of the respective belt members converging toward each other in the direction of the top of the conveyor unit. The center belt member 28 is arranged so that the lower run travels between the two outside belt members 29 and 30, and its tapered side edges 41 and 42 converge toward each other in the direction of the bottom of the conveyor unit. The opposite or outside edges 37 and 39 of the outside belt members 29 and 30 of the three assembly B are seated against the tapered side walls 43 and 44 which define the side edges of the guide recess 27 in the belt guide plate 23 and which have the same taper as the side edges of the belt members. The three belt members 28, 29 and 30 have a combined width, when positioned in edge confronting coplanar relation in the guide recess 27 (Figure 6) which is less than the width of the recess 27 so that the confronting edges 38, 41 and 40, 42 are separated sufficiently to provide passageways 45 and 46 between the center belt member 28 and the two side belt members 29 and 30. The width of the three belt members and their arrangement is such that the center belt member 28 is normally displaced downwardly and out of the plane of the two outside belt members 29 and 30 which brings the tapered edges 40 and 41 in abutting relation with the confronting oppositely tapered edges 38 and 42 of the belt members 29 and 30 so as to form a relatively tight closure across the full width of the recess 27 in the guide plate 23. The two side belt members 29 and 30 are maintained under sufficient tension to hold them in contact with the plate 23, the latter being curved in the direction longitudinally of the conveyor unit as shown in Figure 1 to compensate for part of the sag in the belt members. Mechanism is associated with the center belt member 28 to normally hold this belt with its side edges 41 and 42 in abutting engagement with the side edges 38 and 40 of the belt members 29 and 30, such mechanism however, permitting the belt member 28 to be raised automatically from its normal position to the position shown in Figure 6 when a sheet S is fed between the roller 17 and the receiving end of the conveyor unit.

The belt guide plate 23 is provided with rectangular apertures 47 (Figures 2 to 6) spaced longitudinally thereof with each of the apertures 47 being slightly wider than the transverse width of the center belt member 28 and being arranged in the center of the plate 23 and aligned along the path of the center belt member 28. A pair of identical belt engaging rollers 48 are mounted in each of the apertures or openings 47. The rollers 48 are carried by means of roller bearings 49 preferably on opposite ends of a sleeve member 50 which is in turn eccentrically mounted on end bearing sleeves carried on a cross shaft 51. The cross shaft 51 is mounted at its ends in upstanding bracket formations 52 and 52' which project above the upper face of the plate 23 along the sides of the aperture 47. The rollers 48 are mounted in axially spaced relation on the eccentric sleeve or hub 50 by means of the roller bearings 49 so that the rollers 48 rotate freely about the sleeve 50 while the latter is rotatable on the shaft 51 to raise and lower the rollers 48 in the aperture 47. The eccentric sleeve 50 is arranged on the shaft 51 so that upward pressure on the belt 28 will result in rotation of the eccentric sleeve 50 in a direction to raise the rollers. An arm 53 extends radially of the middle of the eccentric sleeve 50 and in an upward direction which has an elongate axially extending slot 54 in its free end and a control rod 55 extends through the slot. The rod 55 is arranged in spaced relation above the upper face of the belt guide plate 23 and has its opposite ends received in sliding relation in bearing sleeves 56 and 57. The rod supporting sleeves 56 and 57 are mounted at opposite ends of the frame 11 in depending transverse bracket plates 58 and 59 which may also serve as the end closures for the vacuum chamber formed by channel member 22 and belt guide plate 23. At the leading end of the conveyor the control rod 55 is connected to the piston 60 of a double acting hydraulic cylinder 61 which is operable to reciprocate the rod 55 horizontally. Any equivalent rod operating means may be employed such as a solenoid or the like. The control rod 55 carries a series of abutment or stop members 62, each of which is located adjacent an upstanding arm 53 in the direction of the sheet receiving end of the conveyor. The arms 53, slots 54, control rod 55 and stop members 62 cooperate to lower the rollers 48 and return the middle belt member 28 to its lowered or closed position when the cylinder 61 is operated to move the control rod in the direction toward the leading or discharge end of the conveyor.

At the entrance end of the conveyor unit 10 the feed roller 17 is provided with a center peripheral groove 63 (Figure 7) which has a width slightly greater than the width of the lower face of the center belt member 28 so that the belt member 28 normally rides in the groove 63 with its side edges 41 and 42 in abutting engagement with the side edges 39 and 40 of the two side belt members 29 and 30 which is the closed position, the rollers 48 holding the belt member 28 in this position so long as no upward force is applied to its lower surface. The belt member 28 is moved upwardly out of the groove 63 when a sheet S is fed between the roller 17 and the bottom face of the conveyor. The upward movement of the belt member 28 caused by feeding the sheet S opens the passageways 45 and 46 and permits suction to be applied to the sheet through the vacuum chamber apertures 47 as the sheet advances between the belt members and the roller 17. The center belt member 28, in its closed or lowered position, rides on the rollers 48 which positions the arms 53 as shown in Figures 1 and 3. When a sheet is fed between the roller 17 and the belt member 28 is forced upwardly the rollers are raised and the arms 53 automatically swung to the position shown in Figure 4, opening the passageways 45 and 46 between the belt member 28 and the belt members 29 and 30 and allowing the vacuum to become effective on the sheet. As the sheet advances along the bottom face of the conveyor unit 10, through the already opened passageways 45 and 46 the suction applied to the sheet holds it against the bottom surfaces of the belt members 29 and 30 which keeps the belt member 28 in raised position. Each succeeding pair of rollers 48 is lifted by upward movement of the center belt member 28 and the arms 53 swing counter-clockwise to the position shown in Figure 4. When the sheet S has reached a position where the trailing end is clear of the roller 17, the leading edge engages a suitable control arm, indicated at 64 on Figure 1, which operates the cylinder 61 to move the control rod 55 to the right as shown in the drawings. This movement engages the abutment members 62 on the rod 55 with the arms 53 and rotates the roller carrying sleeves 50 sufficiently to force the center belt member 28 downwardly against the upward force of the sheet into closed relation with the two side belt members 29 and 30, thereby cutting off the vacuum pull on the sheet and allowing the sheet to drop onto the pile beneath the conveyor unit 10. Any suitable control device 64 may be employed with its position adjustable along the length of the conveyor so as to accommodate articles of different lengths. Alternately, a control device may be located adjacent the roll 17 so as to be actuated by passage of the trailing edge of the article being conveyed.

In operating the apparatus as illustrated, successive sheets S are delivered by the feeding conveyor 15 and the leading edge of each successive sheet S is guided between the roll 17 and the traveling belt members 28, 29 and 30, the roll 17 being resiliently mounted so as to permit passage of the sheet S between the same and the belts. As the sheet S moves between the roller 17 and the belt members, the center belt member 28 is raised against the weight of the rollers 48. This opens the passageways 45 and 46 between the belt members and allows the sheet to be held by suction against the bottom surfaces of the belt members. As the leading end of the sheet is advanced by the belt members successive portions of the center belt member 28 are raised and suction is applied to the entire portion of the sheet which has passed over the roller 17. When the trailing end of the sheet advances beyond the roller 17 the succeeding portions of the belt member 28 are free to drop to closed position. At the desired point of advance of the sheet S the cylinder 61 is operated by the control device 64 and the control rod 55 is drawn to the right as shown in Figure 1 to force the rollers 48 against the top surface of the center belt member 28 which lowers the belt member and closes the passageways 45 and 46, cutting off the vacuum pull on the sheet and allowing it to drop free of the conveyor. The control rod 55 is automatically returned to its normal position by the double acting piston 61 and the conveyor is in proper adjustment for receiving the next sheet.

The conveyor provides for efficient use of the vacuum system with only a minimum of pumping required for a given length of sheet since the vacuum chamber is open only while a sheet is advancing and no more than the portion of the vacuum chamber equivalent to the length of the sheet will be opened at any time. The length of the passageways 45 and 46 increases only as required by the advance of the sheet. Consequently, the capacity of the vacuum system may be kept relatively low with high operating efficiency.

A modified form of conveyor unit is illustrated in Figures 8 to 11. In this form of the apparatus the main elements for supporting the conveyor unit are identical with the elements for performing the corresponding functions in the form of the apparatus illustrated in Figure 1, the modified apparatus differing only in the details of the conveyor unit. The modified conveyor unit 70 comprises a downwardly facing channel member 71 having its lower face closed by the bottom run of a belt assembly B' which rides on a pair of belt supporting and guiding plates or angle bars 72 and 72' which are secured in the side edge grooves or recesses 73 and 73' provided in the lower edges of the side plates or flanges 74 and 74' of the channel member 71. The guide plates 72 and 72' which form belt slide bars are of generally angular or L-shaped cross section with horizontally disposed bottom flanges 75 and 75' having relatively narrow edge flange members 76 and 76' which are seated in the recesses 73 and 73' and secured therein by screws 77 and 77' or other fastening means. The belt assembly B' cooperates with the belt guiding and supporting members 72 and 72' to form a bottom closure on the downwardly facing channel member 71, the latter having suitable end closures and connections to a vacuum line or pump so as to form a vacuum chamber in the same manner as in the apparatus of Figure 1.

The belt assembly B' comprises three belt sections or belt members 78, 78' and 80 which are mounted on end supporting pulley formations at opposite ends of the conveyor main frame as in Figure 1. Each of the three belt members is of generally truncated triangular cross section. The two outside belt members 78 and 78' are of identical size and shape. These two belt members 78 and 78' are arranged with their lower runs extending in laterally spaced relation along opposite sides of the center belt member 80 and adjacent the side edges of the supporting channel member 71 and with their widest surfaces 81 and 81' facing downwardly and forming the major portion of the lower face of the belt assembly B'. The side belt members 78 and 78' have their tapered side walls or edges 83, 84 and 83', 84' extending upwardly and converging inwardly with the outermost edges 83 and 83' seated against the upwardly and inwardly directed tapered edges 85 and 85' which are formed on the bottom edges of the vertically disposed side members 74 and 74' of the channel member 71. The narrower upper faces 82 and 82' of the side belt members 78 and 78' are seated against the lower faces of the horizontal flanges 75 and 75' of the belt support members 72 and 72'. The belt members 78 and 78' are grooved at 86 and 86' in a lengthwise direction so as to receive longitudinally extending shoulder formations 87 and 87' on the bottom faces of the horizontal guide flanges 75 and 75' which seat in the recesses 86 and 86' and form runners for holding the belts 78 and 78' in longitudinal alignment and preventing their movement toward the longitudinal center of the assembly when suction is applied to their inner ends in the operation of the apparatus. The middle belt member 80 is arranged with its widest surface 88 facing upwardly and its narrowest surface 90 facing in a downward direction. The belt member 80 has an upper base portion 91 of generally rectangular cross section with vertically disposed side edges 92 and 92' which extend upwardly between the laterally spaced, vertically disposed flange portions 93 and 93' of the belt guiding and supporting members 72 and 72' at the center of the assembly. The bottom portion of the belt member 80 is formed to provide upwardly extending outwardly inclined or tapered side edges 94 and 94' which are arranged in confronting relation with the inner oppositely disposed edges 84 and 84' of the side belt members 78 and 78'. The depth of the side edges 94 and 94' on the center belt member 80 is greater than the depth of the confronting side edges 84 and 84' on the belt member 78 and 78' and these confronting edges have the same taper. The width of the bottom face 90 of the center belt member 80 is somewhat less than the minimum distance between the oppositely disposed edges 84 and 84' of the side belt members 78 and 78'. The side edges 94 and 94' terminate at their upper ends in inwardly spaced relation to the vertical side edges 92 and 92' on the base portion 91 of the center belt member and downwardly curved shoulders 95 and 95' extend longitudinally along opposite sides of the belt member 80 with the curved bottom faces thereof in confronting relation with marginal portions of the upper faces 82 and 82' of the side belt members 78 and 78'. When the center belt member 80 is moved to the raised position as shown in Figures 9 and 10 passageways are formed between the side edges 94, 94' of the center belt member 80 and the confronting side edges 84, 84' of the side belt members 78 and 78' which connect the vacuum chamber with the uppermost face of the sheet S. When the belt member 80 is moved to its lowermost or closed position as shown in Figure 8, the passageways are closed by engagement of the edge surfaces 94, 94' with the edge surfaces 84, 84' and the sealing engagement of the shoulder formations 95, 95' with the upper faces 82, 82' of the side belt members 78, 78' so that the vacuum is ineffective to hold the sheet on the conveyor.

The uppermost face 88 of the center belt member 80 engages with a series of supporting rollers 96 which are arranged in longitudinally spaced pairs along the length of the housing 71 and each pair of which is supported on a cross shaft 97 extending between the vertical flanges 93 and 93' of the belt supporting and guiding members 72 and 72'. The rollers 96 of each pair thereof are mounted on a supporting sleeve 98 which is eccentrically mounted for rotation on the cross shaft 97 and which carries an upstanding arm 99 with an elongate slot 100 at its upper end through which a control rod 55 extends. The rollers 96 are of the same character as the rollers 48 and are mounted for operation in the same manner as illustrated in Figures 3 and 4 with the control rod 55 and the operating mechanism therefor being the same as shown in Figures 1 to 4. Cross braces 101 may be provided at suitable longitudinally spaced intervals along the flanges 93 and 93' which is bolted or otherwise secured to the latter to further secure the side belt supporting members 72 and 72' in fixed position.

The two side belt members 78 and 78' are provided on their lowermost surfaces 81 and 81' with a series of longitudinally spaced, laterally extending recesses 102 and 102' of generally rectangular section which connect at their confronting inner ends with upwardly directed edge recesses 103 and 103'. The recesses 102 and 102' constitute a series of longitudinally spaced suction cup formations in the article engaging faces of the belt members which insure that suction is applied to a substantial area of the surface of the sheet S or other article being handled. Longitudinally extending grooves 104 and 104' may be provided in the outside marginal portions 105 and 105' of the bottom faces of the side belt members 78 and 78' to improve the sealing between these belt members and the face of the sheet being conveyed.

The operation of the modified form of the conveyor shown in Figures 8 to 11 is the same as in the form of the apparatus illustrated in Figures 1 to 7. The center belt section or member 80 is normally positioned along its lower run with the shoulder formations 95 and 95' engaging with the marginal edges of the uppermost surfaces 82 and 82' of the side belt members 78 and 78' so that no suction is applied to the article carrying surface of the belt assembly B'. In this position, the lowermost face 90 of the center belt member 80 extends a small distance below the adjoining bottom surfaces 81 and 81' of the side belt members 78 and 78'. The sheets S or other articles to be handled by the conveyor are fed in the same manner as illustrated in Figure 1 to the leading end of the conveyor unit and passed between a feed roller 106 (Figure 8) and the conveyor bottom surface, the feed roller 106 having a peripheral recess 107 which is adapted to accommodate the projecting portion of the center belt member 80 when the latter is in the closed position as shown in Figure 8. When a sheet S is fed between the roller 104 and the bottom face of the belt assembly B the sheet bridges the recess 107 and forces the center belt member 80 upwardly to separate the edges 94 and 94' from the edges 84, 84' of the side belt members 78 and 78' and to raise the sealing shoulders 95 and 95' above the uppermost surfaces 82 and 82' of the side belts 78 and 78' thereby providing passageways for application of suction or vacuum to the surface of the sheet, the area of application being substantially increased by providing the recesses 102 and 102' in the bottom faces 81 and 81' of the side belt members 78 and 78'. The center belt member 80 raises the control rollers 96 in the same manner as described with respect to the belt member 28 and rollers 48 with the control rod 55 being positioned to permit the roller control arms 99 to swing so as to accommodate this upward movement of the belt member 80. When the sheet reaches a position where it is to be deposited on the pile beneath the conveyor unit, the control rod 55 is moved in the longitudinal direction of the conveyor to swing the rollers 96 about their eccentric mounting so as to force the center belt member 80 downwardly into closed position and thus cut off the suction which is applied to the sheet S so that the sheet S is free to fall by gravity onto the pile beneath the conveyor.

Another form of conveyor unit is illustrated in Figures 12 to 15. In this form of the conveyor the housing forming the vacuum chamber and the associated elements for supporting and controlling the belt assembly are substantially the same as those employed in the form of the conveyor illustrated in Figures 8 to 11 and in order to eliminate unnecessary repetition, such elements will be identified by the same numerals as applied thereto in the form shown in Figures 8 to 11, with different numerals being applied where the structure has been modified.

The belt assembly B″ is characterized by being molded of rubber or like material as a single unit which is subdivided into three parallel parts or belt sections consisting of a center belt section or member 110 and two adjoining side sections or members 111 and 111′ extending along opposite edges of the center belt member 110 and initially formed integral with the latter.

The bottom face 112 of the lower run of the entire belt assembly B″ is in a common plane which is horizontal in the open, article gripping and carrying position. In the closed, non-gripping position the bottom face 112 is in a common plane which has a relatively small convex curvature or which is bowed downwardly about a longitudinal axis. The bottom face 112 is also bowed somewhat in the longitudinal direction due to the curvature of the main frame of the conveyor as shown in Figure 1, this curvature being provided to compensate for sag in the lower run of the assembly. The uppermost faces 113 and 113′ of the belt side sections or members 111 and 111′ are provided along their outer margins with upwardly projecting guide ribs or shoulders 114 and 114′ which are received in cooperating guide recesses 115 and 115′ on the bottom faces of the belt supporting and guiding members 72 and 72′. The members 72 and 72′ have the remaining or inner portions 116 and 116′ of their lower faces cut away so that they slant upwardly and inwardly to allow room for vertical movement of the inner portions of the belt assembly, when the support members 72 and 72′ are mounted in the lower face of the supporting channel member 71. The center belt section 110 is thicker than the side belt sections 111 and 111′ and the upper portion thereof extends between the upstanding flange formations 93 and 93′ on the belt guide members 72 and 72′ with its uppermost face 117 engaging with the control rollers 96 which are mounted in the space between the flange formations 93 and 93′.

The belt assembly B″ is provided in its bottom face 112 with longitudinally spaced, transversely extending recesses 118 and 118′ which recesses are arranged in longitudinally spaced pairs with the respective recesses of each pair thereof in transverse alignment. The recesses 118 and 118′ of each pair thereof extend inwardly to wall formations 119 and 119′ which extend outwardly and upwardly in inclined relation from spaced points on the surface 112 of the assembly so as to leave an intervening portion 120 of the surface 112 which constitutes the bottom surface of the center belt section 110. The upwardly inclined wall formations 119 and 119′ terminate short of the top surface 117 of the center belt section 110 and at their upper ends are connected by reversely curved wall portions to relatively short, outwardly and downwardly inclined wall formations 121 and 121′ which terminate at the upper or inner edges of the downwardly facing, outwardly directed curved wall formations 122 and 122′ which form the top wall for the major portions of the recesses 118 and 118′ and which extend to the outermost ends of the latter, adjacent the side edges of the belt assembly B″. The inclined wall formations 121 and 121′ are outwardly bowed as indicated in Figure 15. The recesses 118 and 118′ are connected with the vacuum chamber by passageway forming slits 123 and 123′ which extend diagonally upwardly and outwardly through a relatively thin portion of the belt material at the upper or inner ends of the walls 121 and 121′. The slits 123 and 123′ terminate at the junction of the top walls 113 and 113′ of the side belt sections 111 and 111′ with the vertically extending side walls 124 and 124′ on the upwardly projecting portion of the center belt section 110. The slits 123 and 123′ are formed so that when the belt assembly B″ is in the position shown in Figure 12 with the center belt section 110 urged downwardly by the weight of the rollers 96, the slits 123 and 123′ are closed and the belt assembly B″ forms a tight seal over the space between the belt supporting and guiding members 72 and 72′ and cooperates with the latter to form a bottom closure for the vacuum chamber. When the center belt section 110 is urged upwardly by pressure of a sheet S as in Figure 13, the slits 123 and 123′ are opened up and form passageways connecting the recesses 118 and 118′ with the vacuum chamber. The side belt sections 111 and 111′ have inclined or tapered outer edges 125 and 125′ for engagement with the tapered inner edges 83 and 83′ of the side walls 74 and 74′. Relatively narrow, longitudinally extending recesses 126 and 126′ are provided in the outer marginal portions 127 and 127′ of the side belt sections 111 and 111′ which improves the sealing between the belt assembly and the sheet S when the latter is engaged with the same.

The operation of the form of the apparatus which is illustrated in Figures 12 to 15, is identical with that of the previously described apparatus. The belt assembly B″ is carried on the conveyor unit with the bottom run thereof normally in non-operative or closed position in which the bottom face 112 of the belt assembly B″ has a slight downward curvature, as in Figure 12, with the center belt section 110 being in its lowermost position and the slits 122 and 122′ being pinched to closed position. The sheet supporting roll 127 at the entrance end of the conveyor is provided with a curved peripheral surface for engaging the belt assembly B″ in its normal closed position. When a sheet S is fed across the roll 127 the center belt section 110 is raised a sufficient distance to stretch open the slits 122 and 122′ so as to permit the vacuum to be applied through the recesses 117 and 117′ to the uppermost surface of the sheet S thereby holding the sheet against the bottom face of the conveyor with the recesses acting as continuously traveling vacuum cups which are effective for a distance approximating that covered by the sheet so that the percentage of vacuum lost is very small. The sheet S is released at the proper time by operation of the control rollers 96 as heretofore described in the operation of the previously described forms of the conveyor.

Another modification of the conveyor structure is illustrated in Figures 16 and 17. In this form of the apparatus, the vacuum forming housing 71 and the belt assembly B″ are the same as previously described in the form of the apparatus illustrated in Figures 12 to 15 and these elements will be identified by the same numerals. The supporting and control members for the belt assembly B″ in this form of the apparatus differ from the corresponding members in the previously described forms thereof. The center belt section 110 of the belt assembly B″ is supported by pairs of rollers 96 which are spaced longitudinally of the conveyor as in the apparatus shown in Figure 12. The side belt sections 111 and 111′ are supported by guide forming bracket members 130 and 130′ which carry a series of belt supporting wheels 131 arranged in longitudinally spaced relation thereon and engageable with the uppermost surfaces or faces 113 and 113′ of the side belt sections 111 and 111′ in the article carrying position of the belt assembly B″. The belt guiding and supporting bracket members 130 and 130′ are of generally U-shaped or channel-shaped cross section and are supported in downwardly opening relation on opposite sides of the channel member 71. The members 130 and 130′ have laterally spaced inner flange formations 132 and 132′ which terminate above the upper face of the belt assembly B″ and which carry the cross shafts 97 on which the belt supporting rollers 96 are mounted. The bracket members 130 and 130′ have outer flange formations 133 and 133′ with outwardly extending bosses or shoulder formations 134 and 134' at their lower ends which are seated in cooperating recesses 135 and 135' in the bottom inner margins of the side plates 74 and 74' of the channel member 71 and are secured thereto by bolts 136 and 136', welding or like fastening means. Downwardly facing recesses 137 and 137' are provided in the lower faces or sides of the shoulder formations 134 and 134' of the bracket members 130 and 130' which form guideways for guide formations 114 and 114' which are in the form of upwardly projecting ribs on the upper faces 113 and 113' of the side belt sections 111 and 111' so as to form an edge seal at this point and prevent lateral movement of the belt sections 111 and 111' when the center section 110 of the belt assembly B" is flexed upwardly to open the passageways 122 and 122' and permit suction to be applied to the lower face 112 of the assembly B". The belt supporting wheels 131 on the supporting members 130 and 130' are mounted in roller bearings or in anti-friction relation on support pins or stub shafts 140 which extend inwardly of and in longitudinally spaced relation on the vertical outer flanges 133 and 133' of the support members 130 and 130'. The wheels 131 are of a size and are arranged so that in the closed or downwardly bowed position of the belt assembly B", they are slightly spaced above the latter. When the center belt section 110 of the belt assembly B" is flexed upwardly to open the passageways 123 and 123' the upper faces 113 and 113' of the side belt sections 111 and 111' engage the rollers 131 to support the belt sections 111 and 111' and reduce the friction on the belt members.

The control arrangement for operating the belt assembly B" is different from the control arrangement illustrated in Figure 12. The eccentric mounting 98 for each pair of the wheels 96 is provided with an upstanding operating arm 99 which extends through an elongate slot 141 in a slidably mounted control bar or plate 142 which corresponds to the control rod 55 in Figures 1 to 3 and which may be operated in an identical manner. The slide bar 142 is provided with laterally spaced rail forming members 143 and 143' which are of angular cross section and which ride on the support members 130 and 130' as illustrated in Figure 14, the latter forming a guideway for the slide bar assembly. The slidably mounted control bar 142 is, of course, moved in the same manner as the control rod 55 to open and close the vacuum passageways 122 and 122' in the belt assembly B". Cross braces 144 may be provided at longitudinally spaced intervals between the flanges 132 and 132' of the support members 130 and 130' to assist in holding these members in fixed position in the assembly.

The appartus shown in Figure 16 is used in the same manner as the form of the apparatus previously described with the belt assembly B" being operated to grip or release successive sheets S as the latter are fed thereto.

The belt members or sections in the several forms of the conveyor which are described are preferably formed of rubber or equivalent material with wire or other cord reinforcing material, if desired, for strength and molded to a hardness suitable for the operations described.

The apparatus is designed especially for handling rigid sheets of material but it may be used to handle non-rigid sheets by providing the feed roller (17 or 128) at the entrance end of the conveyor with a uniform surface so as to raise the belt members and apply the vacuum as the leading edge of a sheet is fed between the roll and the bottom face of the conveyor.

While specific materials and particular details of construction have been referred to in describing the form of the apparatus illustrated, it will be understood that other materials and different details of construction may be resorted to within the spirit of the invention.

I claim:

1. In a conveyor assembly having a mounting frame and a plurality of traveling belts supported on spaced end pulleys on said frame, a downwardly opening channel-shaped housing extending along the bottom of the mounting frame, a belt guide plate closing the bottom of the housing and end closure members cooperating therewith to form a vacuum chamber, means for connecting the vacuum chamber to a suction device, said belt guide plate having a belt receiving recess on the bottom face with inwardly tapered side walls which form side edge guides for the outermost edges of the traveling belts along the lower run thereof, said belts being in edge-to-edge relation and being seated in the bottom recess of the belt guide plate, said belts being of uniform width and thickness and each of said belts having a transverse cross section in the form of a truncated triangle, said belts having a combined width when in predetermined transverse alignment with the side edge of each belt in abutting engagement with the side edge of the adjoining belt which corresponds to the width of the recess in the bottom face of the belt guide plate so as to extend completely across said recess, said belts having their side edges in spaced relation when one of said belts is moved upwardly relative to an adjoining belt in said recess, said belt guide plate having a series of elongate openings in longitudinally spaced and longitudinally extending relation therein, and belt engaging rollers in said openings, said belt engaging rollers being journaled on a supporting sleeve member which is eccentrically mounted on a cross shaft supported in said housing, said roller supporting sleeve member having a radially extending arm normally projecting above the inner face of said belt guide plate, a longitudinally extending rod within the housing and having a sliding connection with said arm, said rollers being in engagement with the upper face of a traveling belt and being movable upwardly by reason of said eccentric mounting when pressure is applied to the lower face of the belt which the rollers engage, whereby when an article is forced against the bottom of the conveyor so as to move the belt which is engaged by the rollers in an upward direction in said recess, suction is applied through the openings in the vacuum chamber and between the belts to the top surface of the article to hold the same in engagement with the belts, and said rod having abutment means thereon for engaging the arm on said eccentric sleeve and being movable to swing said arm and position the rollers for applying pressure to the belt which said rollers engage thereby to move said belt downwardly relative to the adjoining belts to cut off the suction and release the article from the conveyor.

2. In a conveyor assembly having a mounting frame and a plurality of traveling belts supported on spaced end pulleys on said frame, a downwardly opening channel-shaped housing extending along the bottom of the mounting frame, a belt guide plate closing the bottom of the housing and cooperating therewith to form a vacuum chamber, means for connecting the vacuum chamber to a suction device, said belt carrying plate having a belt receiving recess on the bottom face with side walls which form side edge guides for the outermost edges of the traveling belts along the lower run thereof, said belts being in edge-to-edge relation and being seated in the bottom recess of the belt guide plate, said belts having a width when the side edge of each belt is in abutting engagement with the side edge of the adjoining belt which corresponds to the width of the recess in the bottom face of the belt guide plate so as to close said recess, said belts having their edges so constructed that they are moved apart when one of said belts is moved relative to an adjoining belt in a direction normal to the bottom face of said belt guide plate, said belt guide plate having a series of elongate openings in longitudinally spaced and longitudinally extending relation therein, and belt engaging rollers in said openings, said rollers being journaled on a sleeve member which is eccentrically mounted on a cross shaft supported in said housing, said roller supporting sleeve having a radially extending arm normally projecting above the inner face of said belt guide plate, a longitudinally extending rod within the housing and having a sliding connection with said arm, said rollers being in engagement with a traveling belt and being upwardly movable by reason of said eccentric mounting when pressure is applied to the lower face of the belt which the rollers engage, whereby when an article is forced against the bottom of the conveyor it will move the belt which is engaged by the rollers in an upward direction and suction will be applied through the openings in the vacuum chamber and between the belts to the top surface of the article to hold the same in engagement with the belts, and said rod having abutment means thereon for engaging the arm on said eccentric sleeve and for moving the same to position the rollers for applying pressure to the belt which they engage to thereby move said belt downwardly relative to the adjoining belts to cut off the suction and release the article from the conveyor.

3. In a conveyor assembly having a mounting frame and a plurality of traveling belts supported on spaced end pulleys on said frame, a downwardly opening channel-shaped housing extending along the bottom of the mounting frame, a belt guide plate closing the bottom of the housing and cooperating therewith to form a vacuum chamber, means for connecting the vacuum chamber to a suction device, said belt guide plate having a belt recess on the bottom face with side walls which form side edge guides for the outermost edges of the traveling belts along the lower run thereof, said belts being in edge-to-edge relation and being seated in the bottom recess of the belt guide plate, said belts having a combined width when the side edge of each belt is in abutting engagement with the side edge of the adjoining belt which corresponds to the width of the recess in the bottom face of the belt guide plate so as to close the bottom face of said recess, said belt guide plate having a series of elongate openings in longitudinally spaced and longitudinally extending relation therein, and belt engaging rollers in said openings, said rollers being journaled on a sleeve member which is eccentrically mounted on a cross shaft supported in said housing, said rollers being in engagement with a traveling belt and being upwardly movable by reason of said eccentric mounting when pressure is applied to the lower face of the belt which the rollers engage, the edges of said belts being so constructed that opening are formed between the edges of the belt which the rollers engage and the edges of the adjoining belts when said roller engaged belt is moved relative to the other belts in a direction normal to the bottom face of said belt guide plate, whereby when an article is forced against the bottom of the conveyor so as to cause the belt which is engaged by the rollers to move upwardly, suction is applied through the openings in the vacuum chamber to the top surface of the article to hold the same in engagement with the belts.

4. In a conveyor assembly having a mounting frame and a plurality of traveling belts supported on spaced end pulleys on said frame, a downwardly opening channel-shaped housing extending along the bottom of the mounting frame, a belt guide plate closing the bottom of the housing and cooperating therewith to form a vacuum chamber, means for connecting the vacuum chamber to a suction device, said belt guide plate having a belt receiving recess on the bottom face, said belts having their lower runs in edge-to-edge relation and seated in the bottom recess of the belt guide plate, said belts extending the width of the recess in the bottom face of the belt guide plate so as to close said recess when the side edge of each belt is in abutting engagement with the side edge of the adjoining belt, said belt guide plate having a series of elongate openings in longitudinally spaced and longitudinally extending relation therein, and belt engaging rollers in said openings, said rollers being supported on a sleeve member which is eccentrically mounted on a cross shaft supported in said housing, said rollers being in engagement with the upper face of one of the traveling belts and urging the belt downwardly by reason of said eccentric mounting, the edge of said one traveling belt and the edge of an adjoining belt being so constructed that when said belts are moved relative to each other in a direction normal to the bottom face of said guide plate the edges separate and passageways are formed between the belts which are in communication with the openings in said belt guide plate, and means operative when an article is fed against the bottom of the conveyor to force the belt which is engaged by the rollers upwardly and separate its edge from the edge of the adjoining belt so that suction is applied through the openings in the vacuum chamber and between the belts to the top surface of the article to hold the same in engagement with the belts.

5. In a conveyor assembly having a mounting frame and a plurality of traveling belts carried on spaced end supports on said frame, a downwardly opening channel-shaped housing extending along the bottom of the mounting frame, a belt guide member closing the bottom of the housing and cooperating therewith to form a vacuum chamber, means for connecting the vacuum chamber to a suction device, said belt guide member having a longitudinal recess forming a belt guideway on the bottom face, said belts having their lower runs in edge-to-edge relation when seated in predetermined vertical relation in said guideway, said belts having a width, when in edge engaging relation, which corresponds to the width of said guideway so as to fill said guideway, said belts being movable vertically relative to each other to separate the edges thereof, said belt guide member having bottom openings along the length thereof, and belt engaging rollers in said openings, said rollers being eccentrically mounted, said rollers being in engagement with a portion of the upper face of one of the traveling belts and urging the belt downwardly by reason of said eccentric mounting, a roller engaging with the lower face of said one traveling belt and adapted to move the belt vertically when an article is fed between said roller and the lower face of said belt whereby to separate the edges thereof from the adjoining belt so that suction is applied through the openings in the vacuum chamber and between the belts to the article to hold the same in engagement with the belts.

6. In a sheet conveyor assembly having a mounting frame and a plurality of traveling belts supported on said frame, a downwardly extending housing on the bottom of the mounting frame, means forming a belt guideway on the bottom of the housing, means for connecting the housing to a suction device, said belts having their lower runs in edge opposed relation and seated in said guideway, said belts having a combined width which corresponds to the width of said guideway so as to close the same when the side edge of each belt is in engagement with the side edge of the adjoining belt, and the bottom face of one of said belts projects below the bottom faces of the adjoining belts, the side edges of said one belt having portions in upwardly diverging planes so that when said one belt is moved vertically a passageway is provided between the side edges of said one belt and the side edges of the adjoining belt, said housing having bottom openings along said guideway, and belt engaging rollers in said openings, said rollers being supported to swing into engagement with said one traveling belt and urging the belt downwardly so that the bottom face thereof projects below the bottom faces of the adjoining belts, an article feeding roll normally engaging the bottom faces of the belts at one end of the conveyor assembly and having a peripheral recess for normally accommodating the downwardly projecting bottom face of said one belt whereby when a sheet is fed between said article feeding roll and the bottom of the conveyor the belt which is engaged by the rollers will be moved upwardly so as to form an opening between said belt and the adjoining belt whereby suction is applied through the openings in the housing and the belts to the sheet to hold the same in engagement with the belts.

7. In a conveyor for articles in sheet form, a mounting frame and a plurality of traveling belts supported on said frame, a housing on the mounting frame, a belt guide at the bottom of the housing, means for connecting the housing to a suction device, said housing having openings into said belt guide, said belts having their lower runs in edge engagement and seated in said belt guide, said belts extending the width of the guide when the side edge of each belt is in engagement with the side edge of the adjoining belt and thereby closing said openings, and belt riders in said openings, said belt riders being in engagement with one of the traveling belts and urging the belt downwardly so as to hold the edges thereof in engagement with the edges of the adjoining belts and project the bottom surface thereof below the bottom surfaces of the adjoining belts, the edges of said belts being so constructed that when said one belt is moved upwardly relative to the adjoining belts openings are formed between the edges which connect with the openings in said housing, and means below the bottom surfaces of the belts for supporting an article as the latter is fed to the bottom of the conveyor, said article supporting means being adapted to urge the article against the bottom surfaces of the belts so as to lift said one belt and the riders whereby suction is applied through the openings in the housing and between the belts to the article to hold the same in engagement with the belts.

8. An article conveyor comprising an elongate frame having a downwardly opening housing, a belt guide plate closing the bottom of the housing and forming therewith a vacuum chamber, means connecting the chamber with a source of vacuum, a plurality of relatively narrow traveling belts supported on pulleys mounted on said frame and having their lower runs extending along the bottom face of said belt guide plate in edge-to-edge contact, said belt guide plate having openings in the bottom thereof which are, in one vertical arrangement of the belts closed by said belts, said belts being so constructed that when one of said belts is moved vertically relative to an adjoining belt their edges separate and the resulting openings connect with the openings in the bottom of said belt guide plate, and article feed means adapted to urge an article against the bottom of the conveyor to vertically displace portions of a belt whereby to provide a connecting passageway between said openings and the bottom of the conveyor so as to apply suction to the article as it is fed to said conveyor.

9. In a conveyor assembly having a mounting frame and a plurality of endless traveling belts carried on spaced end supports on said frame, an elongate housing extending along the bottom of the mounting frame, means for connecting the housing to a suction device, said housing having a belt guiding recess on the bottom face thereof with side walls which form side edge guides for the outermost edges of the lower run of the traveling belts, said belts being in edge-to-edge relation and being seated in the guide recess, said belts having a combined width when the side edge of each belt is in abutting engagement with the side edge of the adjoining belt which corresponds to the width of said guide recess so as to extend the full width of said guide recess, said belts being so constructed that the edges thereof separate when the belts are moved vertically relative to each other, said housing having a series of elongate openings in longitudinally spaced and longitudinally extending relation in the bottom face thereof, and belt engaging rollers in said openings, said rollers each being rotatably mounted on a member which is eccentrically supported on a cross shaft in said housing, said rollers being in engagement with a traveling belt and being movable upwardly due to said eccentric mounting when pressure is applied to the lower face of the belt which the rollers engage, whereby when an article is forced against the bottom of the conveyor so as to move the belt which is engaged by the rollers in an upward direction, suction is applied through the openings in the vacuum chamber to the top surface of the article to hold the same in engagement with the belts.

10. An article conveyor comprising an elongate supporting structure and a plurality of relatively narrow endless traveling belts, means supporting said belts in side-by-side relation on said structure with the lower runs thereof normally in edge contacting relation, means forming a vacuum chamber above the lower runs of said belts and having bottom openings closed by said belts when they are in their normal path, said belts being so constructed that when one of said belts is moved out of its normal path passageways are formed which connect said openings with the bottom faces of said belts, means for guiding said belts in their normal path including pressure elements, and means for guiding an article into engagement with said belts so as to move one of said belts out of its normal path against the force of said pressure elements to provide a passageway for applying the vacuum to the upper face of the article as said article advances along the bottom surface of said conveyor, whereby to hold said article against the bottom surfaces of said belts.

11. An article conveyor comprising an elongate frame, a downwardly extending housing mounted on said frame, a belt guideway on the bottom of the housing, means connecting the housing with a source of vacuum, a plurality of traveling belts carried on end supports mounted on said frame, said belts having their lower runs normally in adjoining relation and their lower faces in non-coplanar arrangement in said guideway, said housing having openings in the bottom face which are covered in the normal arrangement of the belts, said belts being so constructed that when one of said belts is moved vertically relative to an adjoining belt vertical passageways are formed which connect the openings in the bottom face of the housing with the bottom face of the conveyor, and article feed means engaging the bottom faces of said belts, said feed means having a recess for normally receiving said one belt at a lower elevation than the other belts and adapted to cause said one belt to be elevated when an article is fed between the feed means and said belts whereby to apply suction to an article which is fed to the lower face of said conveyor to hold said article on the conveyor.

12. An article conveyor comprising an elongate frame having a plurality of relatively narrow endless traveling belt on end supports on said frame carrying said belts with the bottom faces of the lower runs thereof normally in different transverse planes and the edges thereof in engagement, means forming a vacuum chamber above the lower runs of said belts and having bottom apertures normally closed by said belts, the edges of said belts being so constructed that when said belts are moved into a common plane the edges separate and open a passage to said bottom apertures, yieldable means for holding said belts in edge engaging relation and in said different transverse planes, and means at the article receiving end of said conveyor for normally engaging the bottom faces of said belts and for supporting said belts in said different transverse planes, said belt engaging means being so constructed that when an article is fed between the bottom surface of said conveyor and said belt engaging means said belts are moved into a common plane thereby opening a passage to said bottom apertures and holding the article on the conveyor.

13. An article conveyor comprising an elongate frame, a plurality of relatively narrow endless traveling belts, end supports on said frame carrying said belts with the lower runs thereof normally in side-by-side relation, means forming a vacuum chamber above the lower runs of said belts and having bottom apertures normally closed by said belts, said belts being so constructed that they normally form an imperforate closure for said apertures and when shifted relative to each other passageways are formed between the belts which communicate with said apertures, movably mounted means for holding said belts in their normal path to close said bottom apertures, and means below said conveyor adapted to urge successive articles into engagement with the bottoms of said belts for shifting one of said belts and said belt holding means so as to provide a passageway between said belts for applying suction to the article as it is fed to the bottom surface of said conveyor.

14. An article conveyor comprising a supporting frame, a plurality of traveling belts supported in adjoining transverse relation on said frame with the lower runs thereof normally in edge engaging relation, means forming a vacuum chamber above the lower run of said belts and said chamber having passageways which are closed by said belts when they are traveling in said adjoining transverse relation, said belts being so constructed that when said belts are moved out of said transverse relation openings are formed between the same which connect with said passageways, and means for guiding an article to be conveyed against the bottom faces of said belts when said article is fed to the conveyor, said article guiding means having a recess for normally receiving one of said belts which recess is adapted to be bridged by the articles so as to force said one belt out of said transverse relation whereby to form an opening between said belt and an adjoining belt and provide a passageway from the vacuum chamber forming means to the bottom faces of said belts for application of vacuum to said article to hold the same against said traveling belts.

15. An article conveyor as recited in claim 14, and means to return said one belt to said adjoining transverse relation so as to close said passageway and release said article from engagement with said traveling belts.

16. An article conveyor as recited in claim 15, and means responsive to movement of said articles to actuate said belt return means.

17. In a conveyor assembly having a mounting frame and a plurality of traveling belts carried in parallel relation on spaced end supports on said frame, an elongate housing extending along the bottom of the mounting frame and having a belt guide formation on the bottom face thereof, means for connecting the housing to a suction device, said belt guide formation having inwardly and upwardly tapered side walls which form side edge guides for the outermost edges of the lower run of the traveling belts, said belts being of uniform thickness and having a transverse cross section in the form of a truncated triangle, said belts having a combined width which corresponds to the width of the belt guide formation so as to extend across the full width of the belt guide formation when the side edge of each belt is in abutting engagement with the side edge of the adjoining belt, said belts being arranged so that when one of the belts is moved vertically in relation to an adjoining belt the edges thereof will separate, said housing having bottom openings, and belt engaging rollers in said openings, said belt engaging rollers each being rotatable on a supporting member which is eccentrically mounted on a cross shaft journaled in said housing, said roller supporting members each having an upwardly extending arm, a rod extending longitudinally within the housing and having a sliding connection with each said arm, said rollers being in engagement with the upper face of a traveling belt and being movable upwardly due to said eccentric mounting when pressure is applied to the lower face of the belt which the rollers engage, whereby when an article is fed against the bottom of the conveyor so as to force upwardly the belt which is engaged by the rollers, suction is applied through the openings in the housing and between the belts to the top surface of the article to hold the same in engagement with the belts, and said rod having abutment means thereof for engaging the arms and being movable to swing said arms and position the rollers for applying pressure to the belt which said rollers engage thereby to move said belt so as to engage the edges thereof with the edges of the adjoining belts and cut off the suction thereby releasing the article from the conveyor.

18. An article conveyor comprising an elongate frame, an endless traveling belt assembly which is characterized by a plurality of relatively narrow belt sections and spaced end supports therefor on said frame with the lower runs of said belt sections in side-by-side relation, means forming a vacuum chamber above the lower run of said belt assembly and having apertures in the bottom thereof over which said belt sections travel, said belt sections being so constructed that they form an imperforate closure for said apertures when traveling in their normal path and when shifted relative to each other and out of their normal path passageways are provided between the belt sections which connect said apertures with the lower face of said belt assembly, means including movably mounted members for holding said belt sections in their normal path so as to close said bottom apertures, and means below said conveyor for urging successive articles into engagement with the bottom of said belt assembly thereby to shift one of said belt sections and the holding means therefor so as to provide a passageway between said belt sections for applying suction to the article as it is fed to the bottom surface of said conveyor.

19. An article conveyor comprising an elongate frame, an endless traveling belt assembly which is characterized by a plurality of relatively narrow belt sections and spaced end supports on said frame for carrying said belt assembly with said belt sections in side-by-side relation, means forming a vacuum chamber above the lower run of said belt assembly and having bottom apertures which are normally closed by said belt sections, said belt sections being so constructed and arranged that they normally form an imperforate closure for said apertures and when shifted relative to each other passageways are opened between the belt sections which communicate with said apertures, means including movably mounted members for holding said belt sections in their normal relationship in which they close said bottom apertures, and means below said conveyor for urging successive articles into engagement with the bottom of said belt assembly so as to shift one of said belt sections and the belt holding means therefor relative to the adjoining belt sections and thereby open one or more passageways between said belt sections for applying suction to each article as it is fed to the bottom surface of said conveyor.

20. An article conveyor comprising an elongate, generally horizontal frame, a downwardly extending housing mounted on said frame, means forming a belt guideway on the bottom of the housing, means connecting the housing with a source of vacuum, a travelling belt assembly having a plurality of parallel belt sections carried on spaced end supports mounted on said frame, said belt sections normally having their lower runs traveling in side-by-side relation in said guideway with the lower face of one of said belt sections extending below the lower faces of the adjoining belt sections, said housing having openings in the bottom face thereof which are covered by said belt sections when said belt sections are arranged in their normal position, said belt assembly being so constructed that when said one belt section is moved vertically relative to an adjoining belt section vertical passageways are formed which connect the openings in the bottom face of the housing with the bottom face of the conveyor, and article feed means engaging the bottom face of said belt assembly, said feed means having a portion thereof recessed for receiving said one belt section in its normal position and being adapted to cause said one belt section to be elevated when an article is fed between the feed means and said belt assembly whereby to apply suction to an article which is fed to the lower face of said belt assembly to hold said article on the conveyor.

21. An article conveyor comprising an elongate, generally horizontal frame, a downwardly extending housing mounted on said frame, means forming a belt guideway on the bottom of the housing, means connecting the housing with a source of vacuum, a traveling belt assembly having a plurality of parallel belt sections carried on spaced end supports mounted on said frame, said belt sections having their lower runs in adjoining relation in said guideway and their lower faces normally traveling in paths at different elevations, said housing having openings in the bottom face which are covered in the normal arrangement of the belt sections, said belt assembly being so constructed that when one of said belt sections is moved vertically passageways are opened between said belt sections which connect the openings in the bottom face of the housing with the bottom face of the conveyor, and article feed means engaging the bottom face of said belt assembly, said article feed means having is surface conforming to the bottom faces of said belt sections in their normal poistion and adapted to cause said one belt section to be raised when an article is inserted between the feed means and said belt assembly whereby to apply suction to an article which is fed to the lower face of said belt assembly to hold said article on the conveyor.

22. In an article conveyor as recited in claim 21 and said belt assembly having recesses in the bottom face thereof which connect with said passageways when said passageways are opened whereby suction is applied to the article over the recess areas which are covered by the article.

23. An article conveyor comprising an elongate, generally horizontal frame, a downwardly extending housing mounted on said frame, means forming a belt guideway on the bottom of the housing, means connecting the housing with a source of vacuum, a traveling belt assembly having three transversely aligned parallel belt sections, spaced end supports mounted on said frame and supporting said belt sections with their lower runs in adjoining relation in said guideway and with the lower face of the middle belt section normally extending below the lower faces of the adjoining side belt sections, said housing having openings in the bottom face which are covered in the normal arrangement of the belt sections, said belt sections being constructed so that the middle belt section normally engages with adjacent portions of the two side belt sections and when the middle belt section is moved vertically relative to the side belt sections passageways are formed between the belt sections which connect the openings in the bottom face of the housing with the bottom face of the conveyor, and means beneath the bottom face of said belt assembly for movably supporting an article for engagement with said belt assembly, said article supporting means having a surface confronting the bottom face of said belt assembly which accommodates said middle belt section in its normal position and which lifts said one belt section to an elevated position when an article is fed between the article supporting means and said belt assembly whereby to apply suction to an article which is fed to the lower face of said belt assembly to hold said article on the conveyor.

24. An article conveyor as recited in claim 23 and said middle belt section having a bottom part extending between the two side belt sections and a top part with side marginal portions projecting over the adjacent side marginal portions of the side belt sections.

25. An article conveyor as recited in claim 23 and said middle belt section being formed with a generally wedge shaped part extending between the two side belt sections and forming the bottom thereof in the lower run of the assembly, and with a top forming part of greater width than the maximum distance between the two side belt sections so as to provide downwardly facing marginal edges which overhang the marginal edges of the top faces of the side belt sections, and said side belt sections having oppositely disposed inner edge faces which are shaped to correspond to the confronting edge faces of the middle belt section so as to form a seal between the belt sections when the middle belt section is in its lowermost position where it is in engagement with the side belt sections.

26. An article conveyor as recited in claim 25 and said middle belt section having downwardly projecting shoulder formations extending along the downwardly facing marginal edges of the top forming part thereof.

27. An article conveyor comprising an elongate, generally horizontal frame, a downwardly extending housing mounted on said frame, means forming a belt guideway on the bottom of the housing, means connecting the housing with a source of vacuum, a traveling belt assembly formed from a single belt which is divided into a center section and side sections, said belt assembly being carried on spaced end supports mounted on said frame with the lower run thereof in said guideway, said housing having openings in the bottom face which are covered by said belt assembly, the side sections of said belt assembly having a series of laterally aligned and laterally extending recesses in longitudinally spaced relation on the bottom faces thereof, said recesses having their outer edges spaced inwardly of the outer side edges of said side sections and having their inner ends extending into said center belt section, said recesses having a dimension in the direction of the vacuum chamber which is a maximum adjacent the junction of the center belt section with the side belt sections and having longitudinally spaced slits cut in the belt material approximately at said junction which form passageways between the top and bottom faces of said belt assembly when upward pressure is applied to the bottom face of the center belt section sufficient to raise said center belt section and stretch the belt material in the areas between the belt sections so as to open said slits, said slits communicating, when open, with the openings in the bottom face of said housing, and article feed means engaging the bottom face of said belt assembly, said article feed means having a recess for normally receiving a downwardly extending portion of said center belt section at a lower elevation than the side belt sections and adapted to cause said center belt section to be elevated when an article is fed between the article feed means and said belt assembly whereby to apply suction to an article which is fed to the lower face of said belt assembly to hold said article on the conveyor.

28. An article conveyor comprising an elongate frame, an endless traveling belt assembly which is characterized by being formed as an integral unit having a plurality of relatively narrow parallel sections in side-by-side relation and spaced end supports on said frame for carrying said belt assembly with the lower face of the lower run of said belt assembly forming an article carrying surface, means forming a vacuum chamber above the lower run of said belt assembly and having bottom apertures normally closed by said belt assembly, said belt assembly being constructed and arranged beneath said vacuum chamber so that the sections thereof normally form an imperforate closure for said apertures with one of said sections being adapted to be shifted vertically so as to expose openings between said one section and the adjoining belt section which communicate with said apertures, movably mounted means for holding said belt sections in their normal arrangement so as to close said bottom apertures, and means below said conveyor for urging successive articles into engagement with the bottom of said belt assembly so as to shift said one belt section and said belt holding means vertically and thereby apply suction to said articles as they are fed to the bottom surface of said conveyor.

29. An article conveyor comprising an elongate, generally horizontal frame, a downwardly extending housing mounted on said frame, means forming a belt guideway on the bottom of the housing, means connecting the housing with a source of vacuum, a traveling belt assembly having a plurality of integrally connected parallel belt sections carried on spaced end supports mounted on said frame, said belt sections having their lower runs in adjoining relation in said guideway and their lower faces normally traveling in a transverse plane which is bowed downwardly about a longitudinal axis, said housing having openings in the bottom face which are covered in the normal arrangement of the belt sections, said belt assembly being so constructed that when one of said belt sections is moved vertically passageways are opened between said belt sections which connect the openings in the bottom face of the housing with the bottom face of the conveyor, and means for feeding articles into engagement with the bottom face of said belt assembly, said article feed means having a surface portion conforming to the bottom faces of said belt sections in their normal position and adapted to cause said one belt section to be raised when an article is fed between the article feeding means and said belt assembly whereby to apply suction to said article and to hold said article on the conveyor.

30. In an article conveyor as recited in claim 29 and said belt assembly having longitudinally spaced recesses in the bottom face thereof which connect with said passageways when said passageways are opened so that suction is applied to the article over the recess areas which are covered by the article.

References Cited in the file of this patent

UNITED STATES PATENTS

| | | |
|---|---|---|
| 1,077,400 | Droitcour | Nov. 4, 1913 |
| 1,701,317 | Stokes | Feb. 5, 1929 |